(12) United States Patent
Qiang et al.

(10) Patent No.: US 10,490,227 B2
(45) Date of Patent: *Nov. 26, 2019

(54) SHINGLED MAGNETIC RECORDING STORAGE SYSTEM

(71) Applicant: Seagate Technology LLC, Cupertino, CA (US)

(72) Inventors: Jian Qiang, Singapore (SG); Xiong Liu, Singapore (SG); Choon Wei Ng, Singapore (SG); Sangyun Jung, Singapore (SG)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/205,928

(22) Filed: Nov. 30, 2018

(65) Prior Publication Data

US 2019/0103138 A1    Apr. 4, 2019

Related U.S. Application Data

(63) Continuation of application No. 15/720,486, filed on Sep. 29, 2017, now Pat. No. 10,176,849.

(51) Int. Cl.
*G11B 5/596* (2006.01)
*G11B 27/36* (2006.01)
(Continued)

(52) U.S. Cl.
CPC ............ *G11B 27/36* (2013.01); *G06F 3/0604* (2013.01); *G06F 3/0676* (2013.01); *G11B 5/012* (2013.01); *G11B 20/10009* (2013.01);
*G11B 20/12* (2013.01); *G11B 20/1217* (2013.01); *G06F 2212/60* (2013.01); *G11B 2020/1238* (2013.01);
(Continued)

(58) Field of Classification Search
CPC .............. G11B 5/59655; G11B 5/5965; G11B 5/59627; G11B 5/59633; G11B 5/59688; G11B 15/005; G11B 5/59605; G11B 5/59611; G11B 5/59638; G11B 5/56; G11B 5/58; G11B 5/5521; G11B 5/5526;
(Continued)

(56) References Cited

U.S. PATENT DOCUMENTS

8,611,032 B2   12/2013   Champion et al.
8,947,817 B1    2/2015   Chung et al.
(Continued)

*Primary Examiner* — Nabil Z Hindi
(74) *Attorney, Agent, or Firm* — Holzer Patel Drennan (57) ABSTRACT

The disclosed technology includes methods and systems that reduce off-track write retry operations in shingled magnetic recording systems. In one implementation, the method includes writing data to an initial track, determining which side of the initial track is a shingled side, calculating a percentage of position error signal (PES) at a shingled side end of the initial track (PES1) when an off-track write operation occurs, determining whether the PES1 meets a first pre-determined threshold, continue writing data to a second track responsive to determining the PES1 is below a first pre-determined threshold, calculating a percentage of PES at a shingled side end of the second track (PES2), determining whether a combined value of PES1 and PES2 is above a second predetermined threshold to determine a probability value of the initial track being erased, and continue writing to a third track if the combined value is below the second predetermined threshold.

20 Claims, 4 Drawing Sheets

(51) Int. Cl.
*G11B 20/10* (2006.01)
*G11B 20/12* (2006.01)
*G06F 3/06* (2006.01)
*G11B 5/012* (2006.01)

(52) U.S. Cl.
CPC ............... *G11B 2020/1239* (2013.01); *G11B 2020/1292* (2013.01)

(58) Field of Classification Search
CPC ..... G11B 5/5547; G11B 27/36; G11B 3/0676; G11B 5/012; G11B 20/10009
USPC .. 360/77.02, 78.04, 77.08, 72.01, 75, 77.01, 360/77.05
See application file for complete search history.

(56) References Cited

U.S. PATENT DOCUMENTS

| | | |
|---|---|---|
| 9,099,155 B1 | 8/2015 | Kataria et al. |
| 9,373,347 B2 | 6/2016 | Kim et al. |
| 9,495,988 B1 | 11/2016 | Liu et al. |
| 2015/0109700 A1 | 4/2015 | Kashiwase et al. |
| 2015/0294684 A1 | 10/2015 | Qjang et al. |
| 2016/0034342 A1 | 2/2016 | Toh et al. |
| 2016/0372143 A1 | 12/2016 | Qiang et al. |

SHINGLED MAGNETIC RECORDING STORAGE SYSTEM

CROSS-REFERENCE

This application is a continuation application of U.S. patent application Ser. No. 15/720,486, filed Sep. 29, 2017, now U.S. Patent No. 10,176,849, the entire disclosures of which are incorporated herein by reference for all purposes.

BACKGROUND

As requirements for data storage density increase for magnetic media, cell size decreases. A commensurate decrease in the size of a write element is difficult because in many systems, a strong write field gradient is needed to shift the polarity of cells on a magnetized medium. As a result, writing data to smaller cells on the magnetized medium using the relatively larger write pole may affect the polarization of adjacent cells (e.g., overwriting the adjacent cells). One technique for adapting the magnetic medium to utilize smaller cells while preventing adjacent data from being overwritten during a write operation is shingled magnetic recording (SMR).

SMR allows for increased areal density capability as compared to conventional magnetic recording (CMR) but at the cost of some performance ability. As used herein, CMR refers to a system that allows for random data writes to available cells anywhere on a magnetic media. In contrast to CMR systems, SMR systems are designed to utilize a write element with a write width that is larger than a defined track pitch. As a result, changing a single data cell within a data track entails re-writing a corresponding group of shingled (e.g., sequentially increasing or decreasing) data tracks.

SUMMARY

The disclosed technology includes methods and systems that reduce off-track write retry operations in shingled magnetic recording systems. In one implementation, the data storage systems and methods write data to an initial track in a band of a shingled magnetic recording medium, calculate a percentage of position error signal (PES) at a shingled side end of the initial track (PES1) when an off-track write operation occurs, and determine whether the PES1 is above a first pre-determined threshold. If the PES1 is above the first pre-determined threshold, a re-write operation is performed to the track or media cache. If the percentage of PES1 is below the first pre-determined threshold, data is written to a second track, and a percentage of PES at the second track (PES2) is calculated at a shingled side end of the second track, and a determination is made as to whether the combine value of PES1 and the PES2 is above a second pre-determined threshold to determine a probability value of the initial track being erased. If the combined value of the PES1 and the PES2 is above the second pre-determined threshold, data is re-written to the initial track or media cache. If the combined value of the PES1 and the PES2 is below the second pre-determined threshold, data is written to a third track.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

DETAILED DESCRIPTION

The present disclosure is directed to data storage systems that reduce off-track write retry operations to improve throughput in shingled magnetic recording (SMR) systems. Several factors may impact throughput in SMR systems. For example, disc write retry operations can impact throughput. When disturbances occur, off-track writes can occur frequently and trigger write retry operations.

Disturbances such as impact shock and vibration can be a cause of problems in hard drive disc systems, particularly during write operations. If a disturbance occurs while data is being written to a storage medium, a write element may be knocked off of a target data track. As a result, data may be recorded incorrectly or become corrupted. Disturbances may be caused by a variety of forces, such as a user playing loud music from a laptop computer, vibrations due to cooling fans turning on or off, or external impact forces absorbed by an electronic device.

If a disturbance occurs while data is being written to a storage medium, data may be recorded incorrectly or become corrupted. In some recording systems, storage space is statically mapped so that each data block (e.g., a sector) is associated with a logical address assigned by a host computer. In these types of systems, a write operation affected by a disturbance can be retried at the statically mapped location until the write succeeds. However, write retries are time consuming, and may take a full spin period or revolution time of a magnetic media in the storage medium. If the frequency of disturbance-related write errors is large, throughput performance can decrease. These challenges are magnified in SMR systems.

An SMR drive is a storage device that uses bands of overlapping tracks to increase storage density. In SMR, a new track may be written that partially overlaps a previously written track, creating a shingled aspect to the tracks. SMR leverages the fact that a width of a read head is typically narrower than the width of a write head. The storage density of an SMR drive is increased over conventional drives because the previously written tracks are thinner, allowing for higher track density. In an SMR drive, a set of bands of overlapping tracks may be separated by an isolation space, which serves to reduce the number of tracks that need to be rewritten when a shingled track is rewritten. In SMR, a write element may be large enough to affect two adjacent data tracks on a single pass. If the write element is displaced from a target position by vibrations, adjacent tracks on either side of a target track can be affected.

The present disclosure is directed to data storage systems and methods that include determining whether a write retry operation is required when a write head is off-track to a shingled side of a track in a band of SMR medium. When there is no overlap or an off-track written sector is not erased by the second track write operation, a write retry operation is not performed.

More particularly, the present disclosure is directed to data storage systems and methods that write data to an initial track in a band of a SMR medium, determine which side of the initial track is a shingled side, calculate a percentage of position error signal (PES) at a shingled side end of the initial track (PES1) when an off-track write operation occurs, and determine whether the percentage of PES1 at the shingled side end of the initial track meets a first pre-determined threshold. If the percentage of PES1 at the shingled side end of the initial track is above the first pre-determined threshold, a re-write operation is performed to the track or media cache.

If the percentage of PES1 at the shingled side end of the initial track is below the first pre-determined threshold, data is written to a second track, the second track adjacent to the initial track. A percentage of PES at the second track (PES2) is calculated at a shingled side end of the second track, and a determination is made as to whether a combined value of PES1 and PES2 is above a second pre-determined threshold to determine a probability value of the initial track being erased. If the combined value of PES1 and PES2 is above the second pre-determined threshold, data is re-written to the initial track or media cache. If the combined value of PES1 and PES2 is below the second pre-determined threshold, a writing operation may continue and new data is written to a third track. Thus, off-track write retry operations may be reduced.

As a result of the disclosed methods, there are improvements in a drive's performance under vibration, power consumption by reduction of disc retry operations, and hardware lifespan and noise level by reducing overall mechanical movement.

The technology disclosed herein can be used with various data storage devices. Examples of such data storage devices include hard disc drives. Other kinds of media are contemplated for use with the disclosed technology.

In the following description, reference is made to the accompanying drawing that forms a part hereof and in which are shown by way of illustration at least one specific embodiment. In the drawing, like reference numerals are used throughout several figures to refer to similar components. In some instances, a reference numeral may have an associated sub-label consisting of a lower-case letter to denote one of multiple similar components. When reference is made to a reference numeral without specification of a sub-label, the reference is intended to refer to all such multiple similar components.

Figure 1:
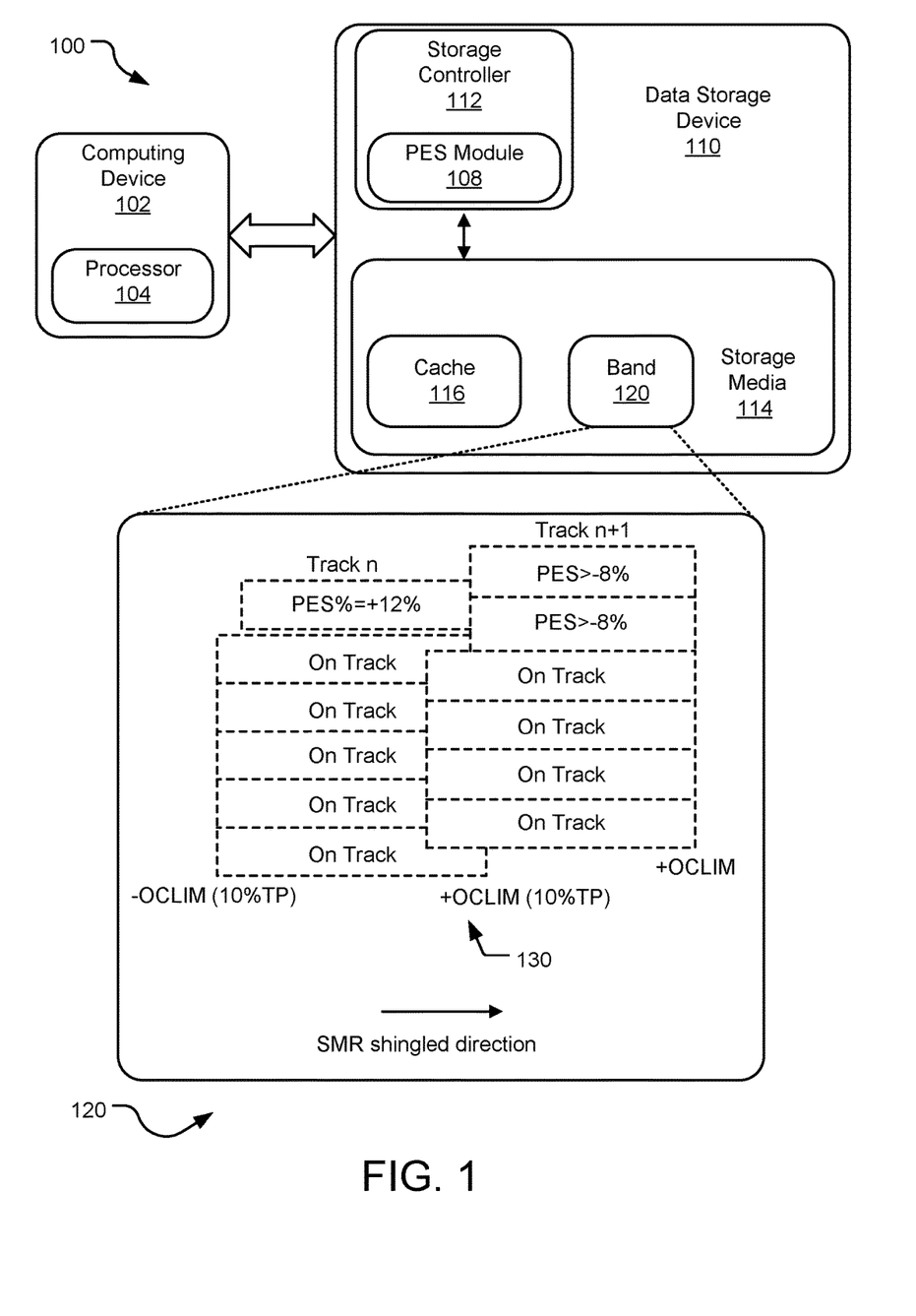
FIG. 1 is a block diagram of an example SMR data storage system, including a schematic diagram of example shingled tracks in the SMR data storage system.

FIG. 1 is a block diagram of an example SMR data storage system 100, showing various functional components used to control the operation of a data storage device 110 (e.g., an SMR HDD, an SMR SSHD, an object storage device, etc.), including a schematic diagram of example shingled tracks in the SMR data storage system.

The data storage system 100 includes a computing or computing device 102 (e.g., a computer, a mobile device, the internet, etc.) operably connected to the data storage device 110, each of the computing device 102 and the data storage device 110 communicating with each other. A processor 104 is located in the computing device 102. The processor 104 sends one or more read or write commands to a storage device controller 112 for execution. As control communication paths are provided between the computing device 102 and the storage device controller 112, the storage device controller 112 provides communication and control for the data storage device 110.

A storage media 114 located in the data storage device 110 may be one or more of a variety of tangible media (excluding carrier waves and communication signals), including hard disk drives. Other kinds of media are contemplated for use with the disclosed technology. The data storage device 110 further includes a cache 116 that is either a storage area on the storage media 114 or another non-volatile memory accessible by the data storage device 110. In the depicted system 100, the cache 116 is a storage area on the storage media 114.

A band (e.g., a band 120) of shingled tracks (e.g., an initial track n and a second track n+1) may also be located in the storage media 114. In FIG. 1, the shingled tracks n and n+1 are located in the band 120. An implementation of the shingled tracks n and n+1 is arranged such that when data is written to one of the shingled tracks n and n+1 (except for the last data track), a writing operation affects data on an adjacent track in the shingled direction in a cross-track direction.

In SMR drives, to reduce write retry operations, data may be written to initial track n in the band 120. The storage controller 112 can determine which side of the initial track n is a shingled side. As shown in FIG. 1, the shingled side is side 130 of track n. When off-track occurs, the storage controller 112 calculates a percentage of position error signal (PES) at the shingled side end of the initial track n (PES1) with a PES module 108.

The storage controller 112 determines whether the PES1 is above a first pre-determined threshold. For example, the first pre-determined threshold may be OCLIM+Δ. An OCLIM (on-cylinder limit) may be defined as the off-track limit, which is pre-determined during drive design. As shown in FIG. 1, in one example, the OCLIM has a 10% track pitch (TP). When a writer position from a track center (position error signals) is greater than OCLIM, a writing operation may be stopped. In other examples, other drives may have different values for OCLIM.

If the PES1>OCLIM+Δ, or above the first predetermined threshold, then the affected sectors of the affected sectors may be rewritten to the initial track n or alternatively, to media cache or NAND Flash. If the PES1<OCLIM+Δ, or below the first predetermined threshold, write operations continue when the off-track is to the shingled side and the PES1 is recorded at the end of the initial track n. A second track n+1 is written, and the percentage of PES is calculated at the end of the second track n+1 (PES2).

If the Δ is defined to +2%, and if the PES1 at the shingled side end of the initial track n is greater than +12%, based on statistics, there is a higher probability that writing to the second track n+1 could erase sectors in the initial track n, and an immediate write retry is required. If the PES1 of an initial track n is greater than 10%, but less than 12%, based on statistics, there is a lower probability that writing to the second track n+1 will erase sectors of the initial track n and there is no need to rewrite off-track sectors on track n.

In some implementations, although data does not need to be rewritten to the previous track (initial track n), the PES may be recorded to accelerate off-line error recovery. The Δ defined to +2% is an example, and the OCLIM is a factor in determining the probability that writing to the second track n+1 could erase sectors in the initial track n, requiring a write retry operation. Specifically, the higher the value of OCLIM, the higher the value of Δ.

When PES2 is calculated at a shingled side end of the second track n+1, a determination is made as to whether a combined value of PES1 and PES2 is above a second pre-determined threshold to determine a probability value of the initial track n being erased. If the combined value of PES1 and PES2 is above the second pre-determined threshold, data is re-written to the initial track n or media cache. If the combined value of PES1 and PES2 is below the second pre-determined threshold, a writing operation may continue and new data is written to a third track (not shown), the third track adjacent to the second track n+1.

For example, referring to FIG. 1, if the second predetermined threshold is 20%, the PES1 at the shingled side end of the initial track n is +12%, and the OCLIM is 10%, if the PES2 to track n+1 is >−8% at the same location or servo wedge, there is a high probability that writing to the second track n+1 did not erase sectors of the initial track n. Thus, if the combined value of PES1 and PES2 is below 20%, a writing operation may continue and new data is written to a third track.

In some implementations, when the off-track direction is distributed evenly, there may be approximately 50% chance to reduce write retry operations. In overall, an SMR drive's performance can be improved, especially during a music test or other environment with disturbances.

Figure 2:
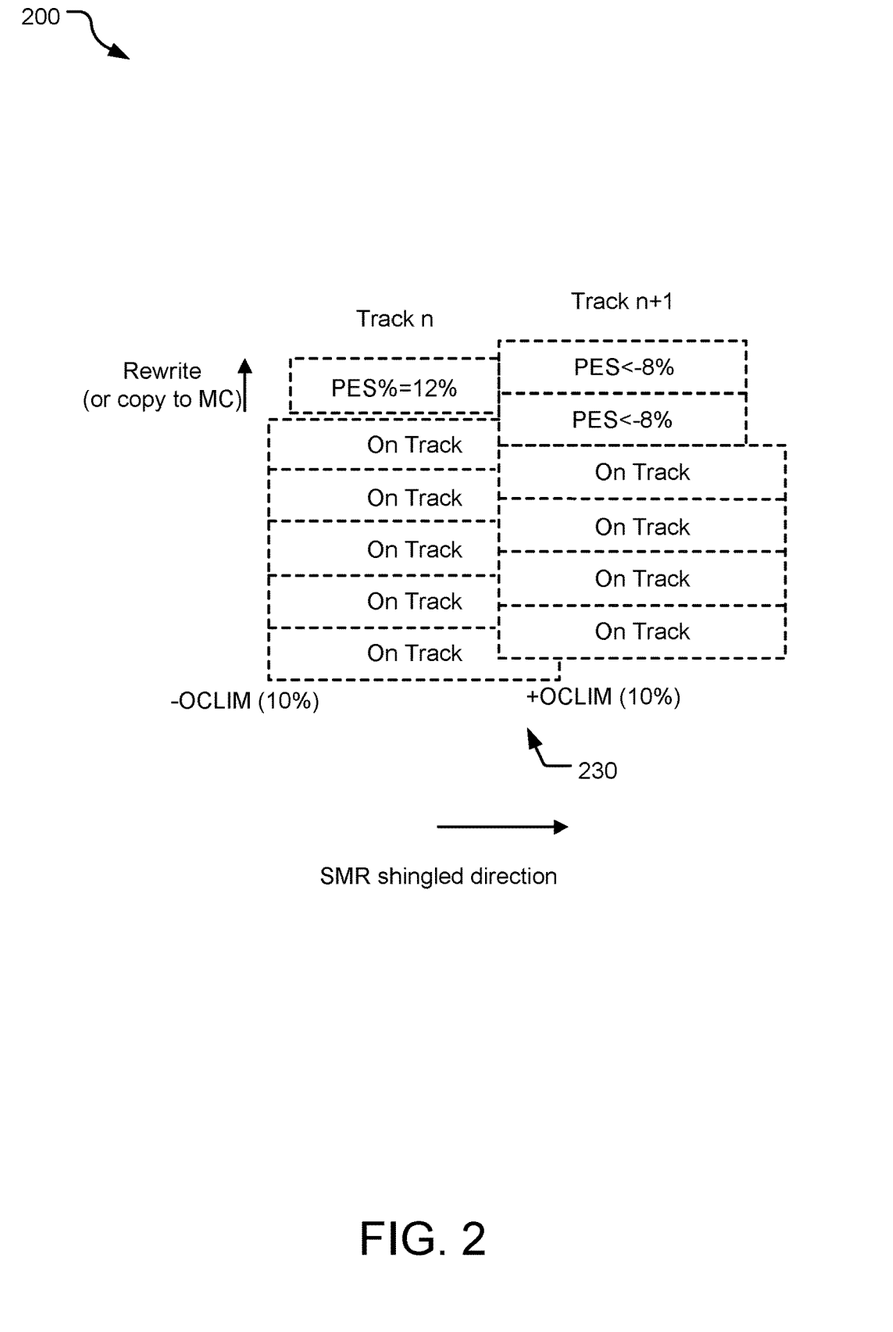
FIG. 2 is a schematic diagram of example shingled tracks in an SMR data storage system.

FIG. 2 is a schematic diagram 200 of example shingled tracks in an SMR data storage system. A storage controller (not shown) can determine which side of the initial track n is a shingled side 230 and when off-track occurs, calculate a percentage of PES at the shingled side end of the initial track n (PES1) with a PES module (not shown).

The storage controller determines whether the PES1 at the shingled side end of the initial track n is above a first pre-determined threshold. For example, the first pre-determined threshold may be OCLIM+Δ. An OCLIM (on-cylinder limit) may be defined as the off-track limit, which is pre-determined during drive design. As shown in FIG. 1 the OCLIM has a 10% track pitch (TP).

If the PES1>OCLIM+Δ, then the affected sectors may be rewritten to the initial track n or alternatively, to media cache or NAND Flash. If the PES1<OCLIM+Δ, write operations continue when off-track to the shingled side and the PES1 is recorded at the end of the initial track n. A second track n+1 is written adjacent to the initial track n. A percentage of PES is calculated at the end of the second track n+1 (PES2).

When PES2 is calculated at a shingled side end of the second track n+1, a determination is made as to whether a combined value of PES1 and PES2 is above a second pre-determined threshold to determine a probability value of the initial track n being erased. If the combined value of PES1 and PES2 is above the second pre-determined threshold, data is re-written to the initial track n or media cache. If the combined value of PES1 and PES2 is below the second pre-determined threshold, a writing operation may continue and new data is written to a third track.

For example, referring to FIG. 2, if the second predetermined threshold is 20%, the PES1 at the shingled side end of the initial track n is +12%, and the OCLIM is 10%, then writing to the second track n+1 could erase sectors in the initial track n, if the PES2 to track n+1 is <−8% at the same location or servo wedge. Thus, if the combined value of PES1 and PES2 is above 20%, data is re-written to the initial track n or media cache. Also, data will need to be rewritten to the shingled sectors on the second track n+1. Alternatively, data may be copied to other caching space, such as media cache or NAND Flash, to further improve throughput.

Figure 3:
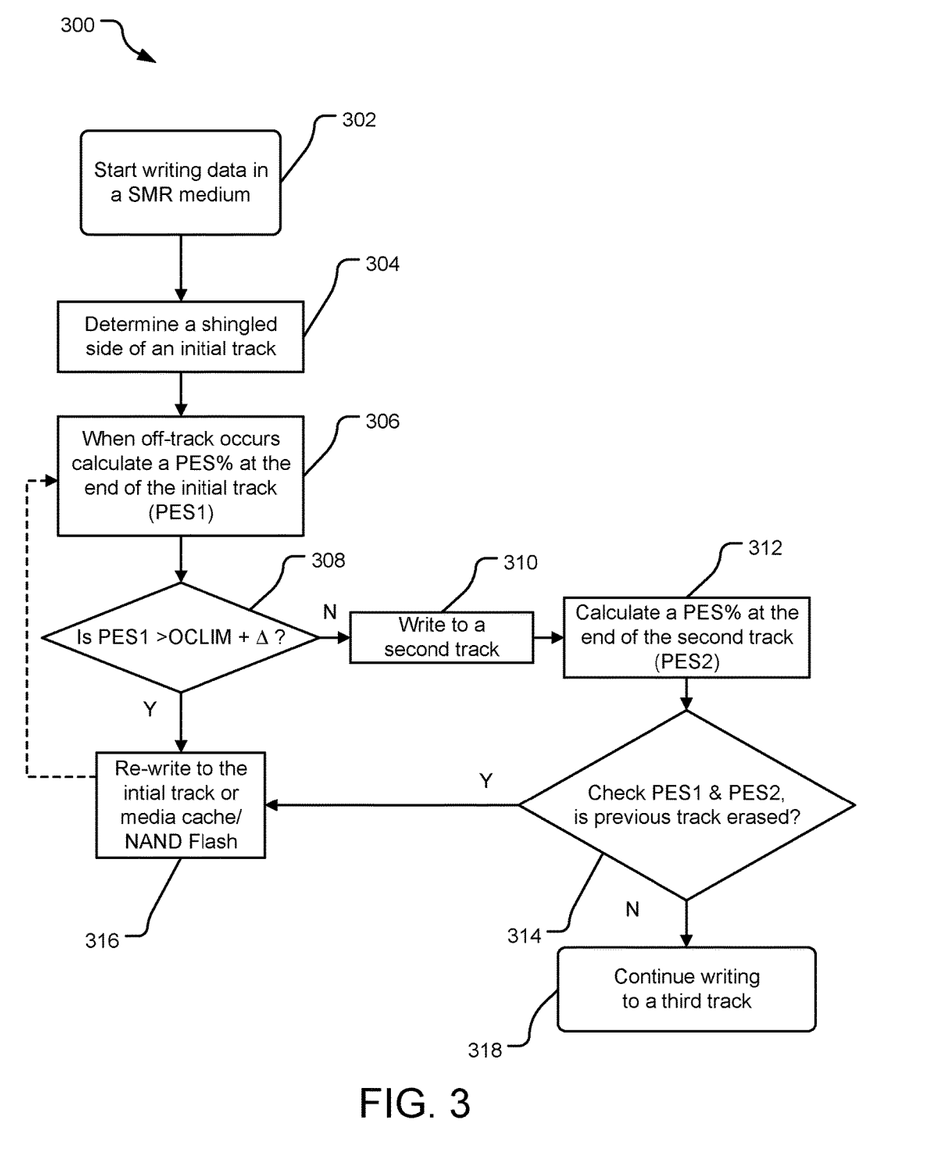
FIG. 3 is a flowchart of example operations for an improved throughput process in an SMR data storage system.

FIG. 3 is a flowchart of example operations 300 for an improved throughput process in an SMR data storage system. An operation 302 receives a write command to write data to an initial track in a band of a shingled magnetic recording medium. An operation 304 determines which side of the initial track is a shingled side.

An operation 306 calculates a percentage of position error signal (PES) at a shingled side end of the initial track (PES1) when an off-track write operation occurs. An operation 308 determines whether the percentage of PES1 at the shingled side end of the initial track is above a first pre-determined threshold.

An operation 316 re-writes to the track or media cache responsive to determining the percentage of PES1 at the shingled side end of the initial track is above the first pre-determined threshold. After operation 316, operation 306 may occur again.

An operation 310 writes data to a second track responsive to determining the percentage of PES1 is below the first pre-determined threshold. The second track is adjacent to the initial track. An operation 312 calculates a percentage of PES at the second track (PES2) when an off-track write operation occurs and an operation 314 determines whether a combined value of PES1 and PES2 is above a second pre-determined threshold to determine a probability value of the initial track being erased.

An operation 316 re-writes to the initial track or media cache responsive to determining the combined value of PES1 and PES2 is above the second pre-determined threshold. An operation 318 writes data to a third track adjacent to the second track responsive to determining the combined value of PES1 and PES2 is below the second pre-determined threshold.

Figure 4:
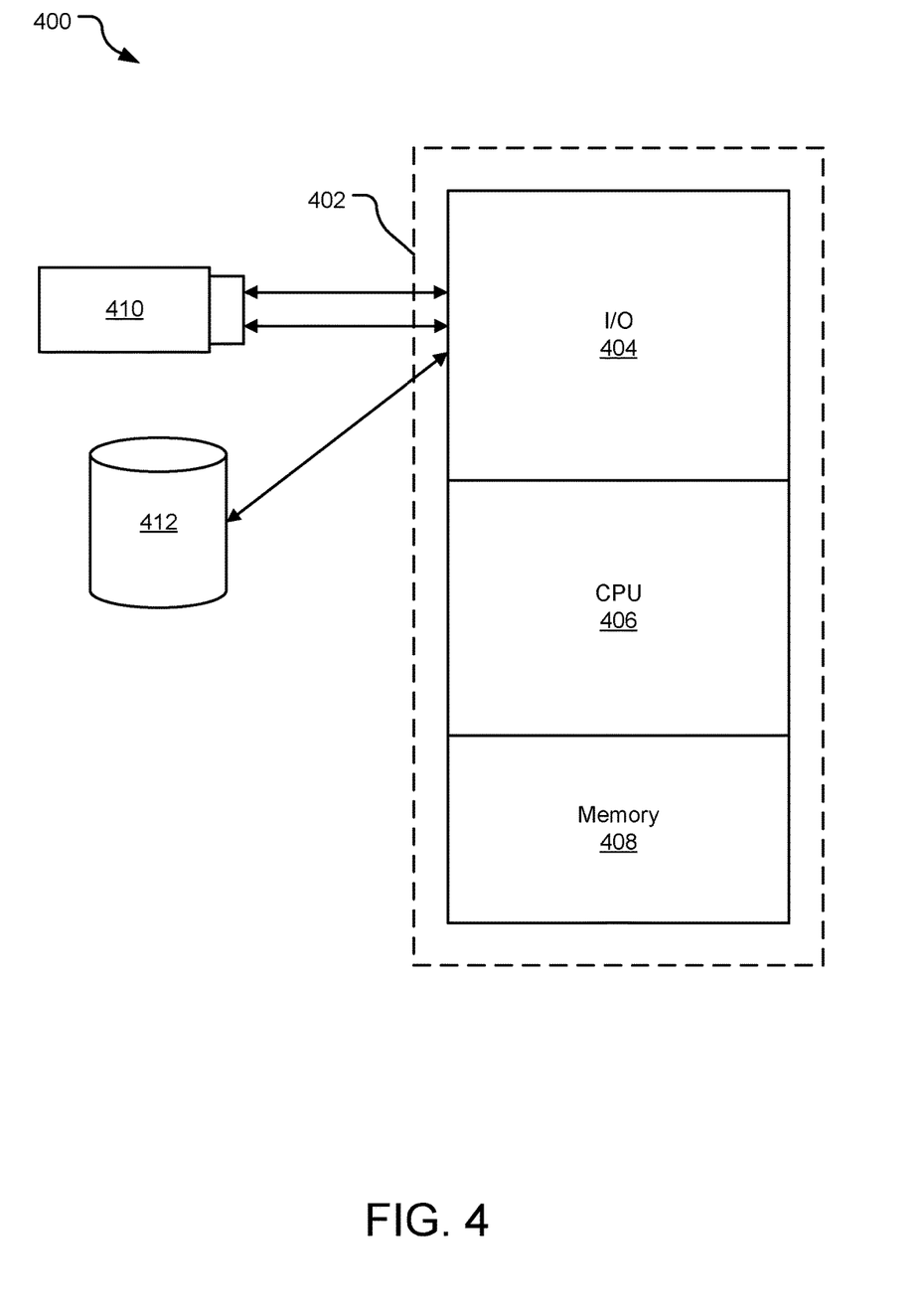
FIG. 4 is a block diagram of an example computer system suitable for implementing the technology disclosed herein.

FIG. 4 illustrates a block diagram 400 of an example computer system suitable for implementing methods and systems of reducing off-track write retry operations in shingled magnetic recording systems disclosed herein. The computer system 400 is capable of executing a computer program product embodied in a tangible computer-readable storage medium to execute a computer process. Data and program files may be input to the computer system 400, which reads the files and executes the programs therein using one or more processors. Some of the elements of a computer system 400 are shown in FIG. 4 wherein a processor 402 is shown having an input/output (I/O) section 404, a Central Processing Unit (CPU) 406, and a memory section 408. There may be one or more processors 402, such that the processor 402 of the computing system 400 comprises a single central-processing unit 406, or a plurality of processing units. The processors may be single core or multi-core processors. The computing system 400 may be a conventional computer, a distributed computer, or any other type of computer. The described technology is optionally implemented in software loaded in memory 408, a disc storage unit 412 or removable memory 410.

In an example implementation, the disclosed system and methods may be embodied by instructions stored in memory 408 and/or disc storage unit 412 and executed by CPU 406. Further, local computing system, remote data sources and/or services, and other associated logic represent firmware, hardware, and/or software which may be configured to adaptively distribute workload tasks to improve system performance. The disclosed methods may be implemented using a general purpose computer and specialized software (such as a server executing service software), and a special purpose computing system and specialized software (such as a mobile device or network appliance executing service software), or other computing configurations. In addition, program data, such as dynamic allocation threshold requirements and other information may be stored in memory 408 and/or disc storage unit 412 and executed by processor 402.

For purposes of this description and meaning of the claims, the term "memory" means a tangible data storage device, including non-volatile memories (such as flash memory and the like) and volatile memories (such as dynamic random access memory and the like). The computer instructions either permanently or temporarily reside in the memory, along with other information such as data, virtual mappings, operating systems, applications, and the like that are accessed by a computer processor to perform the desired functionality. The term "memory" expressly does not include a transitory medium such as a carrier signal, but the computer instructions can be transferred to the memory wirelessly.

The embodiments described herein are implemented as logical steps in one or more computer systems. The logical operations of the embodiments described herein are implemented (1) as a sequence of processor-implemented steps executing in one or more computer systems and (2) as interconnected machine or circuit modules within one or more computer systems. The implementation is a matter of choice, dependent on the performance requirements of the computer system implementing embodiments described herein. Accordingly, the logical operations making up the embodiments described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of example embodiments described herein. Since many alternate embodiments can be made without departing from the spirit and scope of the embodiments described herein, the invention resides in the claims hereinafter appended. Furthermore, structural features of the different embodiments may be combined in yet another embodiment without departing from the recited claims. The implementations described above and other implementations are within the scope of the following claims.

What is claimed is:

1. A method comprising:
   receiving a write command to write data on an initial track in a band of a shingled magnetic recording medium;
   calculating a percentage of position error signal (PES) of the initial track (PES1);
   determining whether the percentage of PES1 meets a first pre-determined threshold; and
   writing data to a second track responsive to determining the percentage of PES1 is below the first pre-determined threshold, the second track being adjacent to the first track in the shingled direction.

2. The method of claim 1, further comprising:
   determining which side of the band is a shingled side; and
   calculating the PES1 at a shingled side end of the initial track when an off-track write operation occurs.

3. The method of claim 1, further comprising:
   re-writing data to a media cache responsive to determining the PES1 is above the first pre-determined threshold.

4. The method of claim 1, further comprising:
   re-writing data to the initial track responsive to determining the PES1 above the first pre-determined threshold.

5. The method of claim 1, further comprising:
   calculating a percentage of PES at a shingled side end of the second track (PES2); and
   determining whether a combined value of PES1 and PES2 is above a second pre-determined threshold to determine a probability value of the initial track being erased.

6. The method of claim 5, further comprising:
   re-writing data to the initial track responsive to determining a combined value of PES1 and PES2 is above a second pre-determined threshold.

7. The method of claim 5, further comprising:
   re-writing data to a media cache responsive to determining a combined value of PES1 and PES2 is above a second pre-determined threshold.

8. A system, comprising:
   a position error signal (PES) module configured to calculate a percentage of PES of an initial track in a band in a shingled magnetic recording medium (PES1); and
   a storage controller configured to:
      determine whether the PES1 meets a first pre-determined threshold; and
      write data to a second track responsive to determining the PES1 is below the first pre-determined threshold, the second track being adjacent to the first track.

9. The system of claim 8, wherein the PES module is configured to calculate the PES1 at a shingled side end of the initial track when an off-track write operation occurs.

10. The system of claim 8, wherein the storage controller is further configured to:
    re-write data to a media cache responsive to determining the PES1 is above the first pre-determined threshold.

11. The system of claim 8, wherein the storage controller is further configured to:
    re-write data to the initial track responsive to determining the PES1 is above the first pre-determined threshold.

12. The system of claim 8, wherein the storage controller is further configured to:
    calculate a percentage of PES at the second track (PES2) at a shingled side end of the second track; and
    determine whether a combined value of PES1 and PES2 is above a second pre-determined threshold to determine a probability value of the initial track being erased.

13. The system of claim 12, wherein the storage controller is further configured to:
    re-write data to media cache responsive to determining the combined value of PES1 and PES2 is above a second pre-determined threshold.

14. The system of claim 13, wherein the storage controller is further configured to:
    re-write data to the initial track responsive to determining the combined value of PES1 and PES2 is above a second pre-determined threshold.

15. One or more tangible computer-readable storage media encoding computer-executable instructions for executing on a computer system a computer process, the computer process comprising:
    receiving a write command to write data on an initial track in a band of a shingled magnetic recording medium;
    calculating a percentage of position error signal (PES) of the initial track (PES1);
    determining whether the PES1 meets a first pre-determined threshold; and
    writing to a second track responsive to determining the PES1 is below the first pre-determined threshold, the second track being adjacent to the first track.

16. The one or more tangible computer-readable storage media of claim 15, the computer process further comprising:
   determining which side of the initial track is a shingled side; and
   calculating a PES1 at a shingled side end of the initial track when an off-track write operation occurs.

17. The one or more tangible computer-readable storage media of claim 15, the computer process further comprising:
   re-writing data to media cache responsive to determining the PES1 is above the first pre-determined threshold.

18. The one or more tangible computer-readable storage media of claim 15, the computer process further comprising:
   re-writing data to the initial track responsive to determining the PES1 is above the first pre-determined threshold.

19. The one or more tangible computer-readable storage media of claim 15, the computer process further comprising:
   calculating a percentage of PES at the second track (PES2) at a shingled side end of the second track; and
   determining whether the PES1 and the PES2 are above a second pre-determined threshold to determine whether the initial track is erased.

20. The one or more tangible computer-readable storage media of claim 19, the computer process further comprising:
   re-writing data to the initial track responsive to determining the combined value of PES1 and PES2 is above a second pre-determined threshold.

* * * * *